(12) United States Patent
Granneman et al.

(10) Patent No.: US 8,002,463 B2
(45) Date of Patent: Aug. 23, 2011

(54) METHOD AND DEVICE FOR DETERMINING THE TEMPERATURE OF A SUBSTRATE

(75) Inventors: Ernst H. A. Granneman, Hilversum (NL); Pascal Vermont, Amsterdam (NL); Vladimir Kuznetsov, Utrecht (NL)

(73) Assignee: ASM International N.V., Bilthoven (NL)

( * ) Notice: Subject to any disclaimer, the term of this patent is extended or adjusted under 35 U.S.C. 154(b) by 621 days.

(21) Appl. No.: 12/138,848

(22) Filed: Jun. 13, 2008

(65) Prior Publication Data

US 2009/0310648 A1 Dec. 17, 2009

(51) Int. Cl.
*G01K 13/02* (2006.01)
*B05C 11/10* (2006.01)
*H01L 21/00* (2006.01)
*G01R 31/00* (2006.01)

(52) U.S. Cl. ....... 374/143; 374/147; 374/1; 156/345.24; 156/345.26; 156/345.27; 438/14; 438/5; 118/708; 118/712

(58) Field of Classification Search .................. 374/1, 2, 374/100, 5, 29, 30, 40, 43–45, 134, 137, 374/141, 142, 143, 147; 438/FOR. 407, 438/14, 5, 715, 758; 118/708, 712, 666; 257/E21.002, 21.211; 156/345.24, 345.26, 156/345.27

See application file for complete search history.

(56) References Cited

U.S. PATENT DOCUMENTS

| | | | | | |
|---|---|---|---|---|---|
| 4,512,391 | A | * | 4/1985 | Harra | 165/48.1 |
| 5,556,204 | A | * | 9/1996 | Tamura et al. | 374/161 |
| 6,183,565 | B1 | | 2/2001 | Granneman et al. | |
| 6,374,150 | B2 | * | 4/2002 | Redinbo et al. | 700/121 |
| 7,281,405 | B2 | * | 10/2007 | Mayer et al. | 73/1.06 |
| 7,802,917 | B2 | * | 9/2010 | Gaff et al. | 374/143 |
| 2004/0004989 | A1 | * | 1/2004 | Shigeoka | 374/121 |
| 2010/0301011 | A1 | * | 12/2010 | Sneh | 216/58 |
| 2010/0309604 | A1 | * | 12/2010 | Gaff et al. | 361/234 |
| 2011/0017139 | A1 | * | 1/2011 | Chiang et al. | 118/723 E |

* cited by examiner

*Primary Examiner* — Gail Verbitsky

(74) *Attorney, Agent, or Firm* — Weingarten, Schurgin, Gagnebin & Lebovici LLP

(57) ABSTRACT

The publication discloses a method for determining a temperature of a substrate, comprising: providing a gas channel that is confined by at least one wall having a certain wall temperature; providing a substrate in said gas channel, proximate to the at least one wall, such that a gap exists between a surface of the substrate and the at least one wall; providing a gas flow with a certain mass flow rate through said gas channel, which gas flow extends at least partially through said gap; determining a pressure drop in the gas flow along the gas channel; and deriving from said pressure drop the temperature of said substrate using a pre-determined relation between the pressure drop along the gas channel, the wall temperature and the temperature of the substrate, at said mass flow rate. Also disclosed is a device for implementing the disclosed method.

13 Claims, 5 Drawing Sheets

METHOD AND DEVICE FOR DETERMINING THE TEMPERATURE OF A SUBSTRATE

TECHNICAL FIELD

The present invention relates to the field of substrate processing, and in particular to methods and devices for determining a temperature of a substrate during treatment.

BACKGROUND

In many fields of technology substrates are put through a variety of physical and chemical treatments. The temperature of a substrate during processing may thereby be of paramount importance, while at the same time it is difficult or practically impossible to take measurements thereof using conventional methods.

A good example of this issue can be found in the field of semiconductor processing, where a wafer may be heated within a "floating wafer reactor" as described in U.S. Pat. No. 6,183,565 and marketed under the trademark Levitor® by ASM International N.V. of Bilthoven, The Netherlands. In a floating wafer reactor substrates are brought one by one and successively between two essentially flat furnace bodies parallel to the substrate, after which the furnace bodies are moved towards one another and positioned a short distance, 2 mm or less, away from the wafer. The wafer is supported without mechanical contact by gas streams emanating from a large number of passages in the furnace bodies close to its upper and lower surfaces. A floating wafer reactor may be used to subject a wafer to a so-called spike annealing treatment. An inserted wafer is thereby rapidly heated to a certain temperature at which it is kept for a relatively short time, the anneal time, which is on the order of seconds. Physically, the rapid heating of the wafer is primarily accounted for by heat conduction from the hot furnace bodies to the (relatively) cold wafer, through the narrow gaps of gas therebetween. Though heating of the wafer takes place quickly, the residence time of the wafer in the reactor may be shorter than the time needed to reach its final temperature. In order to gain better control over the process and to improve the repeatability thereof, it is desirable to be able to monitor the actual temperature of the wafer during processing. Conventional ways of temperature measurement are problematic however. Pyrometric temperature measurement, for example, requires optical access to the wafer. Such optical access is not available in the reactors that are currently being manufactured by applicant, while creating it would disturb the thermal design of the apparatus. Furthermore, pyrometric temperature measurement depends strongly on the reflectivity of the substrate and requires complex algorithms to compensate for any variations in reflectivity due to, for example, temperature dependency. Conventional temperature measurement using thermocouples on the other hand, which requires mechanical contact of the thermocouples with the wafer during processing, is at variance with the basic principle behind the system. In a Levitor reactor, wafer support is fully taken care of by the gas streams that not only heat the wafer uniformly, but also support and position it. The flow pattern of the gas streams is thus vital to the operation of the Levitor reactor, while mechanical components for temperature measurement in the gas bearing are likely to disrupt and alter said pattern.

It is therefore an object of the present invention to provide an accurate method for determining a substrate temperature during processing, whereby optical and/or mechanical contact with the substrate is not required.

SUMMARY OF THE INVENTION

To this end, a method is disclosed for determining a temperature of a substrate, which method includes providing a gas channel that is confined by at least one wall having a certain wall temperature, and providing a substrate in said gas channel, proximate to the at least one wall, such that a gap exists between a surface of the substrate and the at least one wall. The method further includes providing a gas flow with a certain mass flow rate through said gas channel, which gas flow extends at least partially through said gap. The method also includes determining a pressure drop in the gas flow along the gas channel, and deriving from said pressure drop the temperature of said substrate using a pre-determined relation between the pressure drop along the gas channel, the wall temperature and the temperature of the substrate, at said mass flow rate.

The pressure difference corresponding to a certain gas flow through the gas channel in which the substrate is disposed will depend on the temperature of the substrate. This is due to the fact that the at least one channel wall and the substrate have a strong thermal interaction by means of heat conduction through the gas present in the narrow gap that separates them. In particular, heat may be transferred from the wall to the substrate through the gas, or vice versa. As a result of this heat conduction, the state of the gas in the narrow gap, such as the temperature and density, is related to the temperature of the wall as well as to the temperature of the substrate. In case the gas flow is confined in one way or another, as it is in the gas channel, a relation exists between the different thermodynamic variables of the system. This relation may be adapted to form a model that can be used to relate a pressure drop along the gas channel to the temperature of the substrate, at a given flow rate of the gas. 'The temperature of the substrate' may refer to the average temperature of the substrate's surface, which to good approximation equals the overall temperature of the substrate, especially when the substrate is relatively thin and/or has a high thermal conductivity such as is the case with a semiconductor wafer. 'Mass flow rate' is meant to indicate the movement of mass per time, having the unit mass divided by time, or standard liters per minute (slm).

According to an aspect of the disclosed method, the gap between the wall and the substrate's surface has a width of less than 1 mm, more preferably 0.5 mm or less and most preferably has a width of about 150 μm.

For a given temperature difference across the gap of flowing gas between the wall and the surface of the substrate, a smaller gap width yields a greater temperature gradient. A small gap width thus promotes heat exchange, as it is the temperature gradient that can be said to drive the heat flux between the wall and the substrate. As a result, a cold substantially flat plate-like substrate of limited thickness having two main surfaces and placed proximate to and parallel to a substantially flat hot wall that extends over an entire main surface of the substrate will rapidly assume the temperature of the wall.

According to an elaboration of the disclosed method, the gas flow has a substantially constant mass flow rate.

If the mass flow rate of the gas flow is kept substantially constant over a certain period of time, any changes in the average temperature of the substrate's surface that occur during that period may be monitored accurately and conveniently as they will be reflected directly by changes in the pressure drop along the gas channel.

According to a further elaboration of the disclosed method, the temperature of the substrate is determined periodically.

Periodical determination of the temperature the substrate allows its value to be monitored, and to be used to inform the operator of the substrate processing apparatus and/or to control components thereof if a certain substrate temperature is achieved so that action may be taken if desired.

The invention further provides a substrate processing device, including a gas channel that is confined by at least one wall that can be kept at a certain temperature using heating or cooling means, the gas channel being configured to accommodate a substrate, proximate to the at least one wall, such that a narrow a gap exists between a surface of the substrate and the at least one wall. The device further includes a gas source for providing a gas flow having a certain mass flow rate through said gas channel. The device also includes a control unit that is connected to a pressure sensor arrangement that is configured for measuring a pressure drop in the gas flow along the gas channel in which a substrate is disposed, the control unit being configured for deriving from said pressure drop measurement the temperature of said substrate using a pre-determined relation between the pressure drop along the gas channel, the wall temperature and the temperature of the substrate, at said mass flow rate.

The above-mentioned and other features and advantages of the invention are described in or are apparent from the following detailed description considered together with the attached drawings.

DETAILED DESCRIPTION

Figure 1:
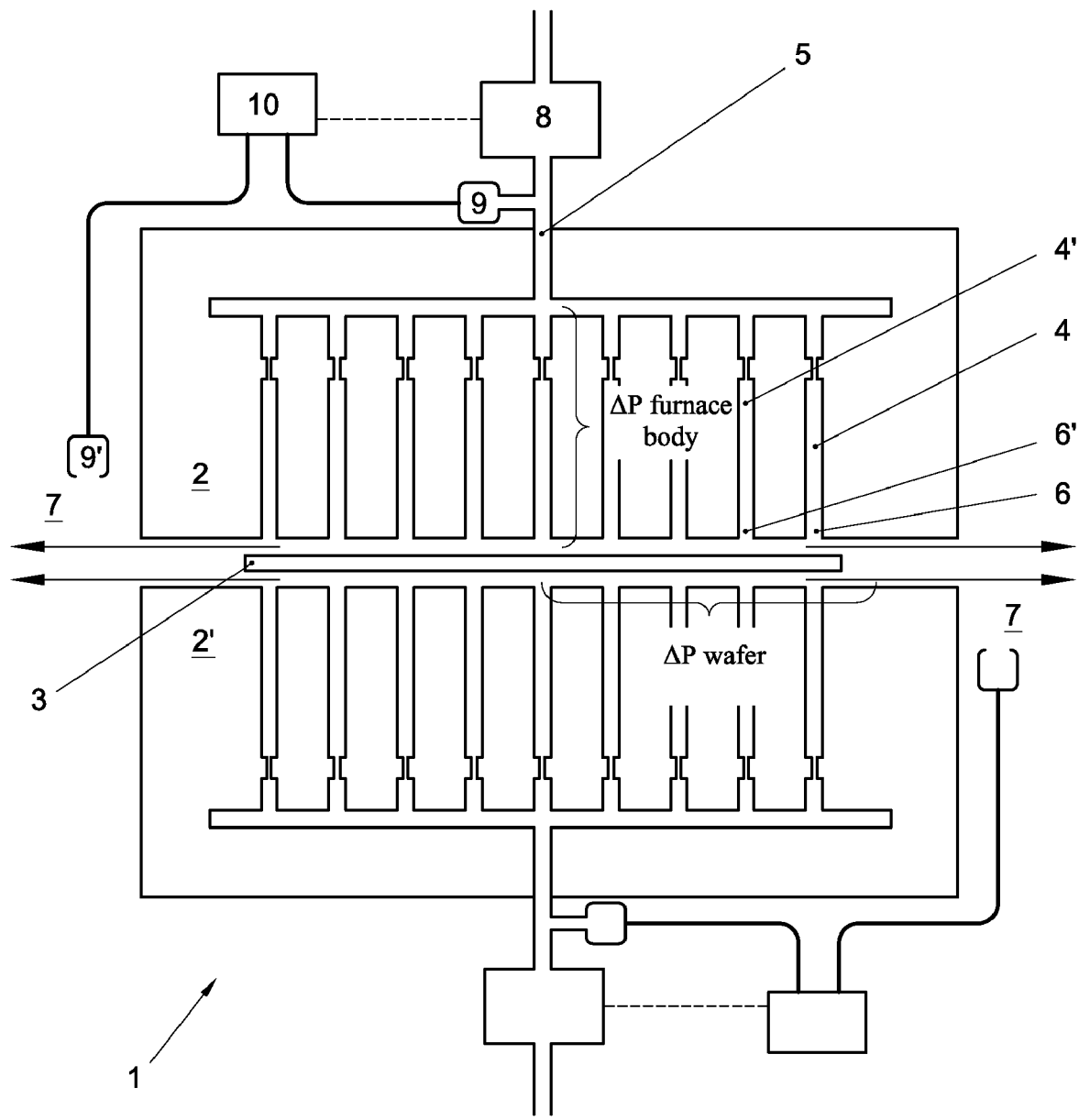
FIG. 1 illustrates a schematic cross-section of a floating wafer reactor.

FIG. 1 shows a schematic cross-section of a floating wafer reactor 1 that may be used to implement the disclosed method. Below, the workings of floating wafer reactor 1 will first be elucidated briefly in general terms. Subsequently, it will be shown how, in this apparatus, a wafer temperature can be related to a pressure drop along a gas channel.

Floating wafer reactor 1 comprises two relatively massive furnace bodies 2, 2' facing one another, and adapted for receiving a substantially flat, plate like substrate of limited thickness having two main surfaces such as a wafer 3 in a space therebetween. Preferably, the surface of the furnace bodies 2, 2' is substantially flat and extends across an entire main surface of the plate like substrate and substantially parallel to said main surface such that the width of the gap between them is essentially constant. Preferably, the distance between an upper and lower surface of wafer 3 and the respective adjacent furnace body 2, 2' is—in use—less than a millimeter, preferably less than half a millimeter, typically about 150 µm. The pressure difference $\Delta P$ across a gap between two parallel plates through which a gas flows in a direction parallel to the plates with a mass flow rate Q is inversely proportional to the gap width g to the third power:

$$\Delta P \sim Q/g^3 \qquad [1]$$

The implication of this relation is that by decreasing the gap width by a factor of 2, an 8 times larger pressure difference will be measured, assuming a constant mass flow rate of the gas. The gap width g can be chosen such that $\Delta P$ can be measured with adequate accuracy to achieve sufficient accuracy in the temperature value obtained according to the method of the present invention.

As the two furnace bodies 2, 2' may be identical, only upper furnace body 2 is provided with numerals that are referenced below. Note however that described characteristics of upper furnace body 2 apply (mutatis mutandis) to lower furnace body 2' as well, unless stated otherwise.

Furnace body 2 is fitted with a gas inlet conduit 5 which is in communication with a large number of interconnected gas conduits 4, 4', etc. These gas conduits 4, 4' have outlets 6, 6', etc. at a surface of furnace body 2 that is facing an upper surface of wafer 3. A mass flow rate controller 8 supplies gas from a pressurized source of gas (not shown) to gas inlet conduit 5. From there, the gas flows through gas conduits 4, 4', etc. to the respective conduit outlets 6, 6', etc., where it is discharged into the gap between the upper furnace body 2 and the wafer 3. Gas is likewise supplied into the gap between the lower furnace body 2' and the lower surface of wafer 3. The gas thus supplied to the gaps between furnace bodies 2, 2' and the wafer 3 provides thin gas cushions that support wafer 3 such that it floats. In order to maintain the gas flow—and with it the gas bearing—, gas is allowed to flow radially outward between the furnace bodies 2, 2' and the respective surfaces of the wafer 3, to an exterior space 7. The pressure in exterior space 7 is kept constant, typically around 1 atmosphere. This value is not entirely arbitrary, as its magnitude relative to the magnitude of any pressure variations present within wafer reactor 1 is advantageously large. Consequently, said pressure variations are of minor relevance when the absolute pressure of the gas is a variable to be reckoned with.

The relatively massive furnace bodies 2, 2' are heated by heating means (not shown) to a furnace body temperature $T_{furnace\ body}$. Basically, the furnace bodies 2, 2' serve as thermal flywheels. Gas flowing through gas conduits 4, 4' etc. inside the furnace bodies 2, 2' heats up to this furnace body temperature, which is preferably above 200° C., and typically in the range of 300-1100° C. After leaving the furnace bodies 2, 2' through the outlets 6, 6', etc., the heated gas comes into contact with wafer 3. Wafer 3 may or may not have the same temperature as the furnace bodies 2, 2'. In case wafer 3 was just inserted between the two furnace bodies 2, 2', it is likely to have a temperature different from the furnace body temperature, usually a lower one. In that case, it will extract heat from the gas that contacts the wafer (i.e. the gas bearing) to heat up, a process that will stop as soon as wafer 3 acquires furnace body temperature. Because the gaps between the furnace bodies and the wafer are very narrow, typically 0.15 mm, heat transport by conduction through the gaps is very high. As the furnace bodies are relatively massive, the heat withdrawn from the furnace bodies for heating up the wafer does not significantly affect the temperature of the furnace bodies. It is through this mechanism that floating wafer reactor 1 may be used to, for example, subject a wafer 3 to a spike annealing treatment.

A mass flow rate controller 8 controls the flow of gas through the inlet conduit 5, the conduits 4, 4', etc., and the gap between furnace body 2 and wafer 3, out into the exterior space 7. Together, these separate sections of the gas flow path may be thought of as a single gas channel.

A control unit 10 may be used to control the mass flow rate controller 8, for example to adjust its flow rate settings. Control unit 10 may also be connected to a pressure sensor arrangement, comprising one or more pressure sensors 9, 9'. A pressure sensor 9 may be used to measure $P_{inlet}$ in the inlet conduit 5, whereas another pressure sensor 9' may be employed to measure $P_{exterior}$ in the exterior space 7. Preferably, pressure sensors 9, 9' are differential pressure sensors, measuring the pressure relative to atmospheric pressure. In alternative embodiments, pressure sensors may be used that measure the absolute pressure. From these measurements, the control unit 10 may calculate the pressure drop along the gas channel. Alternatively, since the gas pressure $P_{exterior}$ in exterior space 7 is typically very close to atmospheric pressure and approximately constant, a single pressure sensor 9 measuring $P_{inlet}$ may be used to determine the pressure drop along the gas channel, or at least the changes therein. Note that the absolute pressure drop along the channel can be determined using a single differential pressure sensor 9 in case a reference port of the sensor is exposed to the pressure $P_{exterior}$ present in the exterior space 7. Further, temperature sensors for measuring the temperature of furnace body 2 may be connected to control unit 10 and the heating means for heating furnace body 2 may be subjected to the control of control unit 10 as well, ensuring that the temperature of furnace body 2 is available to the control unit, which is especially relevant in case the furnace body temperature is a system variable. Preferably, the temperature sensors for measuring the temperature of furnace body 2 are located proximate to the surface of furnace body 2 that is facing wafer 3.

Figure 2:
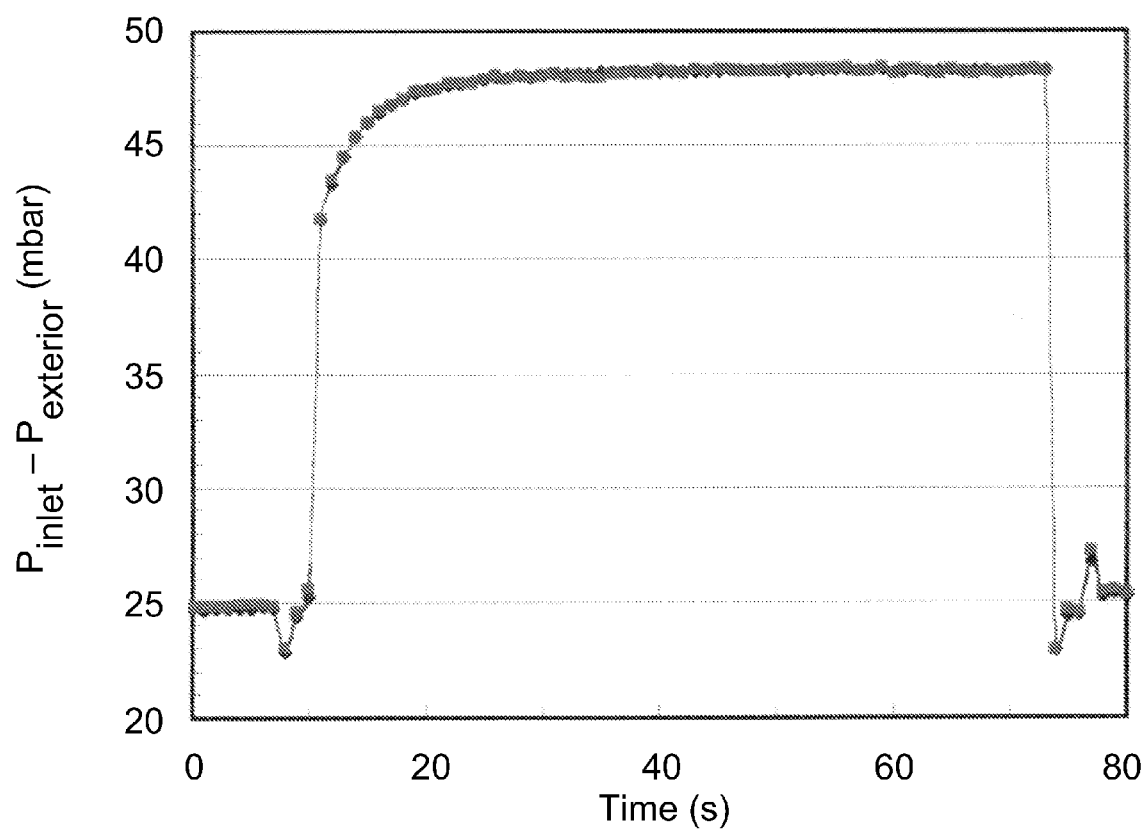
FIG. 2 illustrates the dependency of the pressure drop in a gas flow having a constant flow rate on the presence and temperature of a wafer that is inserted therein.

Interestingly enough, it can be shown that when mass flow rate controller 8 is set to maintain a constant mass flow rate for the gas flow, and a relatively cold wafer 3 is introduced between the two furnace bodies 2, 2', the pressure $P_{inlet}$ at inlet 5 increases during a certain time from insertion, after which it stabilizes. FIG. 2 illustrates with actual measurement data how $P_{inlet}$, or in fact $P_{inlet} - P_{exterior}$, may behave in time. The pressures are measured periodically, at a rate of e.g. one time per second or five times per second. The sensor used has a time resolution of 1 milliseconds allowing a rate of 1000 measurements per second. A wafer to be annealed is inserted between the furnace bodies 2, 2' at around t=8 s, and removed again at approximately t=74 s. The observed behaviour, which indicates a relation between $P_{inlet}$ and both the presence of the wafer and its temperature, may be explained in more detail as follows.

Referring to FIG. 1 again. In the gas channel extending from the inlet conduit 5 to the exterior space 7, two parts may be identified: a first part from the inlet conduit 5 to the gas conduit outlets 6, 6', etc., and a second part covering the gap, which extends from outlets 6, 6', etc. to the exterior space 7. A gas flow Q through the gas channel induces over the first part a pressure drop $\Delta P_{furnace\ body}$, and over the second part a pressure drop $\Delta P_{wafer}$. Any pressure drop along the length of the inlet section 5 is assumed to be incorporated in $\Delta P_{furnace\ body}$. As the temperature profile throughout furnace body 2 is substantially constant during the processing of a wafer 3, so is $\Delta P_{furnace\ body}$. The average temperature of the gas in the second part of the gas channel however is not constant, at least not during the initial period after inserting a wafer, as long as an inserted wafer 3 has not reached it final temperature. During the heating of wafer 3, heat is transferred from furnace body 2 to wafer 3, by conduction through the flowing gas present in the gap between them. As the gas is confined between the surface of the furnace body 2 facing the wafer and the wafer 3, the average gas temperature will to good approximation equal the average of the wafer temperature and the furnace body temperature. The furnace body temperature is known and substantially constant. Thus, when the wafer temperature increases, so does the average gas temperature in the narrow gap between wafer 3 and furnace body 2. Due to its increasing temperature the gas expands, decreasing its density. Other effects of the increasing temperature—for example a change in the viscosity of the gas—may be observed as well, but are less significant.

As the mass flow rate through both parts of the gas channel is kept constant by the mass flow rate controller 8 while the gas in the second part expands due to its increasing temperature, the pressure drop across the gas channel increases. The pressure drop along the gas channel, $\Delta P_{channel}$, can be expressed by the relation:

$$\Delta P_{channel} = P_{inlet} - P_{exterior} = \Delta P_{furnace\ body} + \Delta P_{wafer}, \quad [2]$$

Since the pressure drop across a furnace body, $\Delta P_{furnace\ body}$, is substantially constant in case of an approximately constant temperature profile across the furnace body and a constant mass flow rate, any changes in $\Delta P_{channel}$ are primarily a reflection of changes in the pressure drop along the wafer, $\Delta P_{wafer}$. Further, as $P_{exterior}$ is typically very close to atmospheric pressure, it suffices to measure $P_{inlet}$ using a differential pressure sensor relative to atmospheric pressure.

The point to appreciate here is that variations in the pressure drop along the gas channel, $\Delta P_{channel}$, may be related to the varying pressure drop $\Delta P_{wafer}$ along the wafer, while variations in $\Delta P_{wafer}$ may be related to changes in the average temperature of the gas in the second part of the gas channel. The average temperature of the gas in the second part, $T_{gas2}$, may to good approximation be defined as the average of the wafer temperature, $T_{wafer}$, and the furnace body temperature, $T_{furnace\ body}$:

$$T_{gas2} = (T_{furnace\ body} + T_{wafer})/2. \quad [3]$$

Consequently, there exists a relation between the pressure drop along the gas channel, $\Delta P_{channel}$, and the actual wafer temperature, $T_{wafer}$. This relation may be derived theoretically and/or computationally by applying fluid dynamics theory to the specific apparatus at hand—in this case floating wafer reactor 1—, or be inferred empirically from a calibration of the apparatus. In practice the latter method is preferable, as the relation between $\Delta P_{channel}$ and $T_{wafer}$ may depend strongly on the exact geometry and other characteristics of the apparatus. Theoretical or computational models to predict the thermodynamic behaviour of the apparatus are therefore almost necessarily intricate, and cumbersome to create.

A calibration procedure to determine the quantitative relation between the pressure drop along the gas channel, $\Delta P_{channel}$, and the actual wafer temperature, $T_{wafer}$, at a certain constant mass flow rate, may comprise several steps. Here, these steps will be illustrated with respect to the exemplary wafer reactor 1, shown in FIG. 1. The calibration procedure to be described may be applied to both the upper and the lower furnace body of reactor 1. In that case two relations would be obtained, one of which relates the pressure in the inlet conduit 5 of the upper furnace body 2 to the temperature of the wafer, whereas the other relates the gas pressure in the inlet conduit of the lower furnace body to the temperature of the wafer 3. This 'double calibration' may be advantageous since in this way a second temperature value will now be obtained which should be essentially identical to the first temperature value and which can be used for verification. When the two values are not identical an error is present in the setup. In case of a plate like substrate, such as a semiconductor wafer, a temperature gradient between the upper and lower surface of the wafer is in all practical situations insignificant. Below, for reasons of clarity, the temperatures of the furnace bodies 2 and 2' above and below the wafer are assumed to be identical, and the calibration procedure will be illustrated in terms of upper furnace body 2 references.

A first step of the calibration procedure is to determine the relation between the pressure drop along the wafer, $\Delta P_{wafer}$, and the average temperature of the gas in the second part of the channel, $T_{gas2}$. According to equation [2], $\Delta P_{wafer}$ equals $\Delta P_{channel}$ minus $\Delta P_{furnace\ body}$. Both these latter terms can be assessed independently. To this end, one may first establish the relation between $\Delta P_{furnace\ body}$ and $T_{furnace\ body}$ by measuring $\Delta P_{channel}$ at various values of $T_{furnace\ body}$ in a situation where there is no wafer present between the furnace bodies. In these circumstances the gas in the furnace body assumes furnace body temperature, i.e. $T_{gas1}=T_{furnace\ body}$, and $\Delta P_{wafer}$ is effectively zero because there is no wafer to obstruct the gas flow, so that $\Delta P_{channel}$ equals $\Delta P_{furnace\ body}$. Preferably, measurements of $\Delta P_{furnace\ body}$ are taken at incremental steps—for example of 50° C. or 100° C.—of the furnace body temperature, such that a broad temperature domain is properly covered. Secondly, one may determine the relation between $\Delta P_{wafer}$ and $T_{gas2}$. This may be done by measuring $\Delta P_{channel}$ at various values of $T_{furnace\ body}$—preferably at the same incremental steps used before—in a situation where there is a wafer present between furnace bodies 2, 2', and wherein the wafer 3 has been between the bodies long enough to ensure that it has acquired a stable and final temperature, equal to the furnace body temperature. Under these conditions the reactor is in an isothermal state, defined by the relation $T_{furnace\ body}=T_{gas1}=T_{gas2}=T_{wafer}$. To finally obtain $\Delta P_{wafer}$ as a function of $T_{gas2}$ one may subtract the two relations established above, according to:

$$\Delta P_{wafer}(T_{gas2})=\Delta P_{channel}(T_{gas1},T_{gas2})-\Delta P_{furnace\ body}(T_{gas1}) \qquad [4]$$

Function $\Delta P_{wafer}(T_{gas2})$ provides the pressure drop $\Delta P_{wafer}$ along the wafer on input of a given temperature $T_{gas2}$ of the gas in the second part. It is noted that a determined function $\Delta P_{wafer}(T_{gas2})$ is valid only at the mass flow rate at which the above-described measurements were taken. In case several different mass flow rates are in use by the apparatus to be calibrated, each one of them is preferably assigned its own $\Delta P_{wafer}(T_{gas2})$ in order to obtain a reliable model for the whole working range of the apparatus.

Figure 3A:
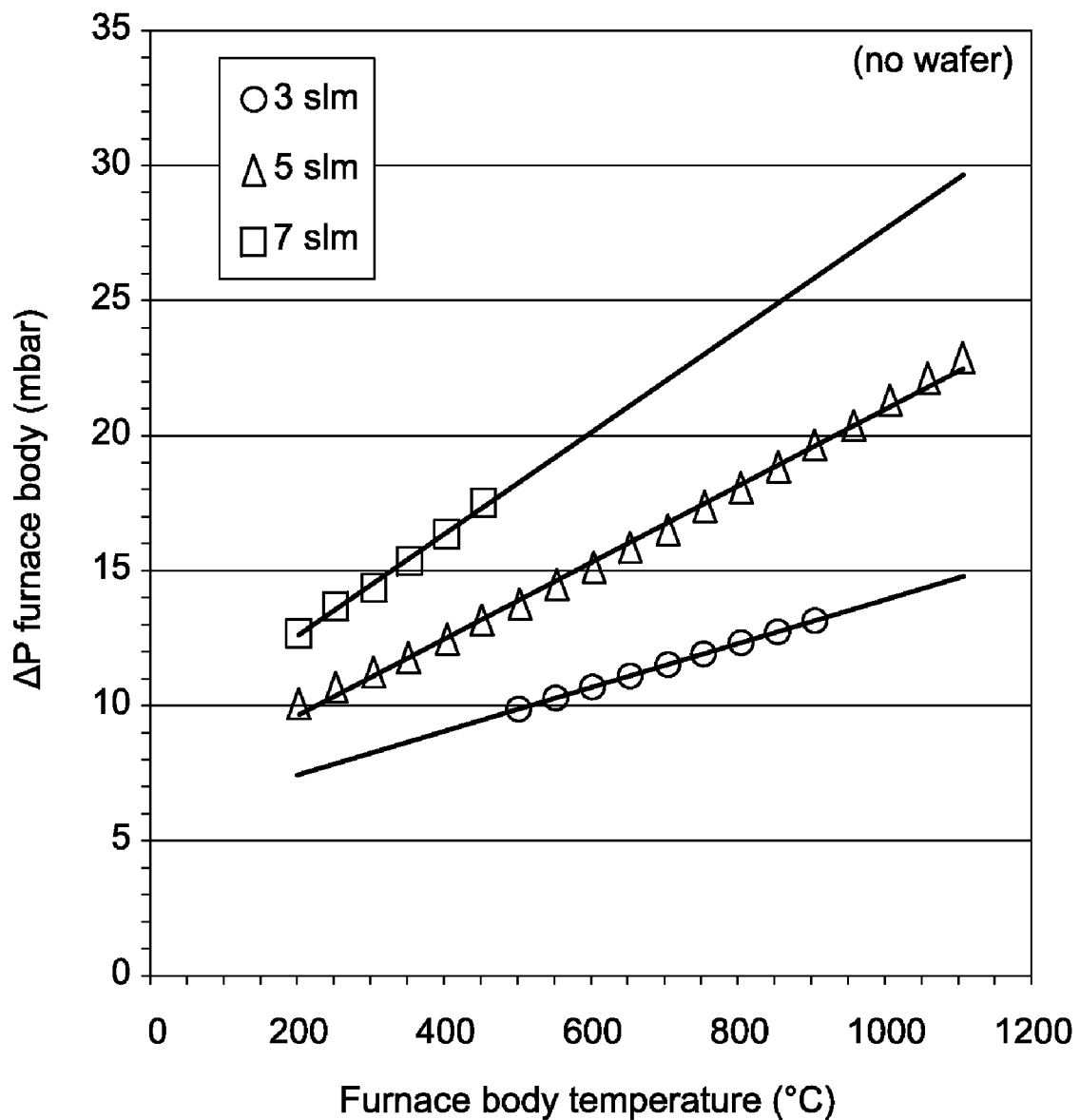
FIG. 3A-C illustrate the first step in a calibration procedure for the floating wafer reactor.
Figure 3B:
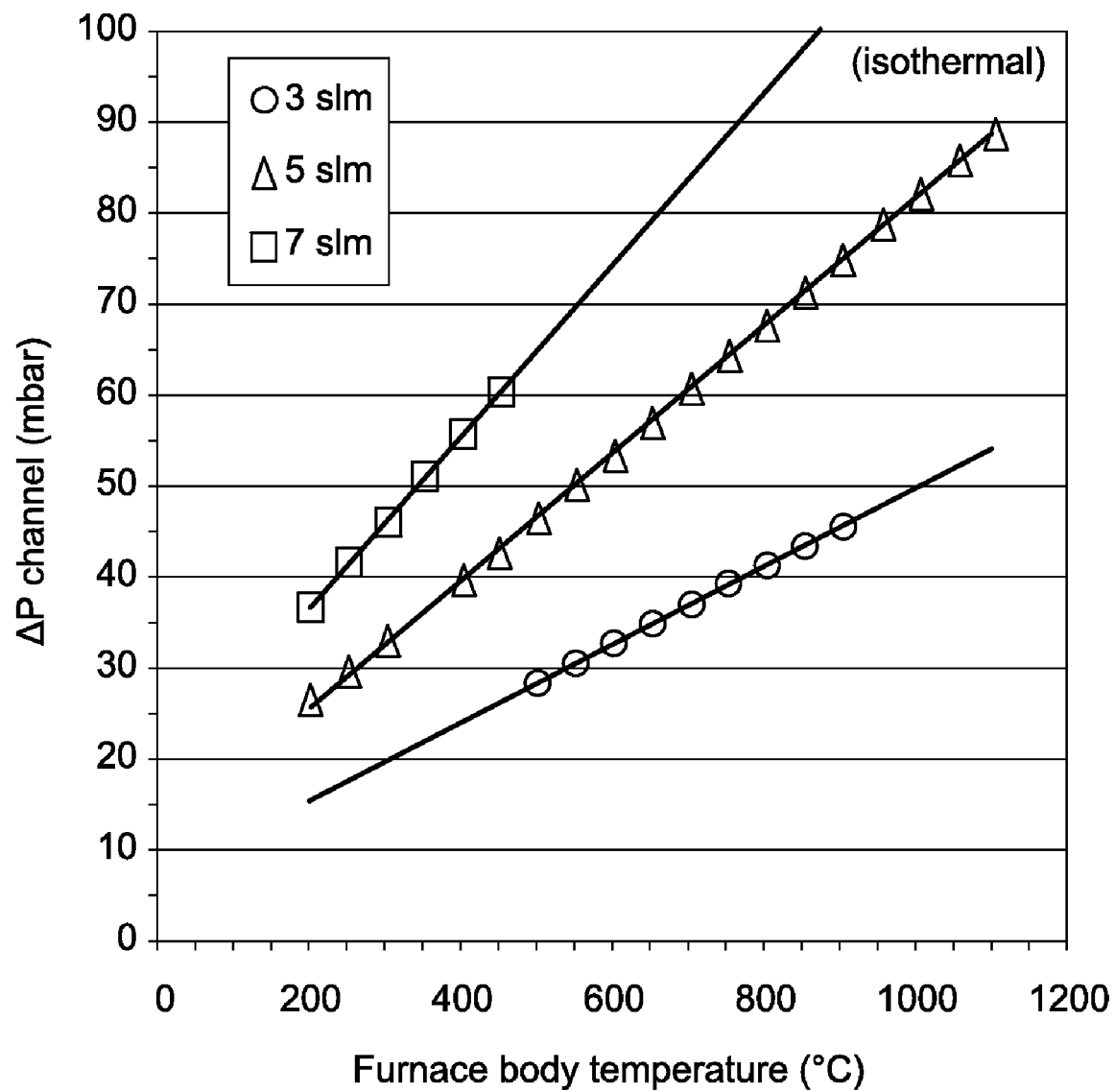
Figure 3C:
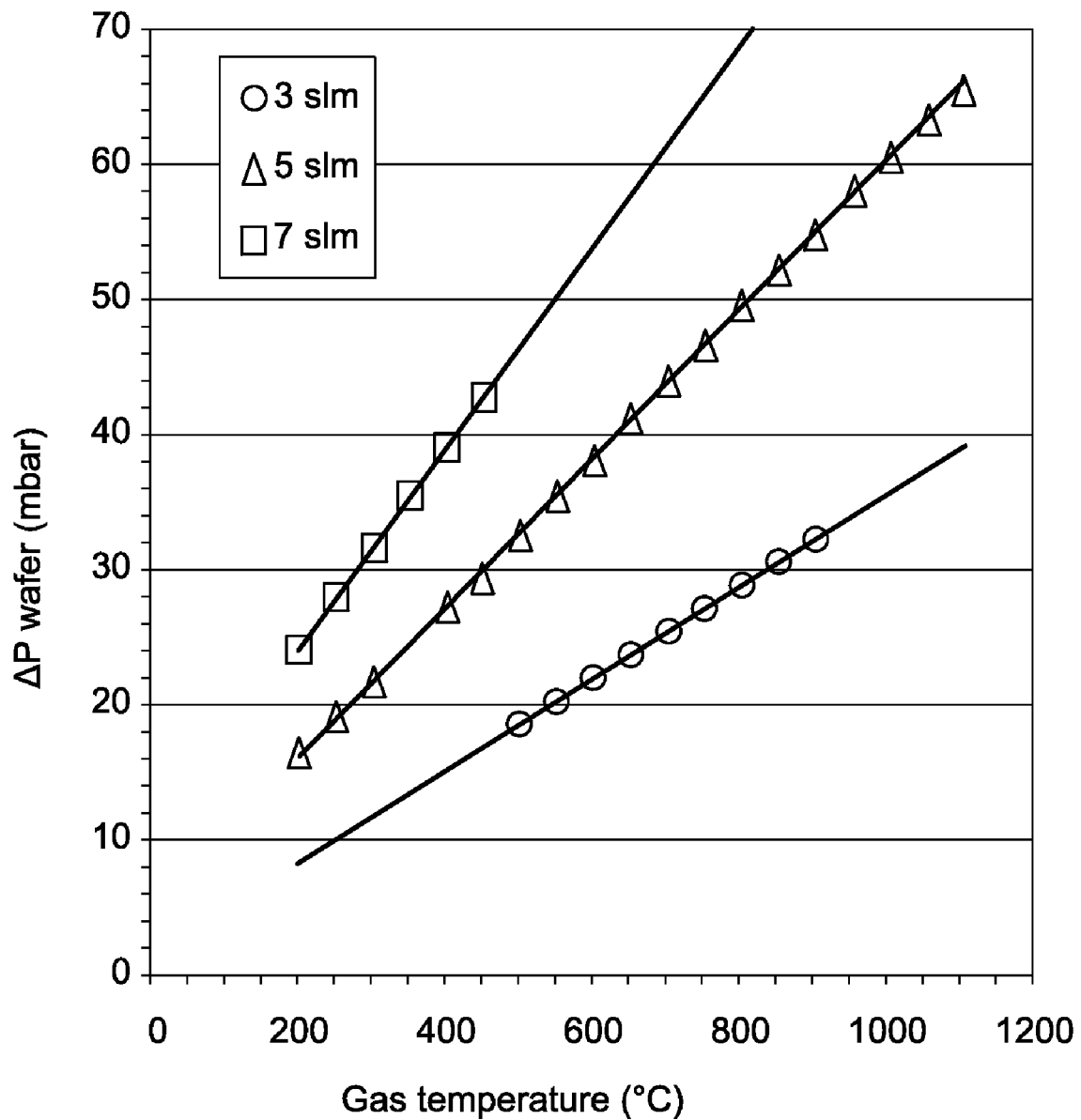

The first step of the calibration procedure may be illustrated graphically by FIG. 3A-C. FIG. 3A shows three series of $\Delta P_{furnace\ body}$ measurements which are plotted against the furnace body temperature $T_{furnace\ body}$. The three series correspond to three different mass flow rates, namely 3, 5, and 7 standard liter per second (slm). The measurements were taken with no wafer 3 present between the furnace bodies 2, 2', such that $T_{gas1,2}$ equals $T_{furnace\ body}$. The data have been fitted by a straight line to obtain a first order approximation to the function $\Delta P_{furnace\ body}(T_{furnace\ body})$. Note that the approximate linearity of this relation, as indicated by the measurement data, can be deduced from the ideal gas law, which states that, at approximately constant (absolute) pressure—e.g. about 1 atmosphere—the volume of a gas is proportional to its temperature. Further, the pressure difference resulting from a gas flow through a constant restriction is proportional to the volume flow of the gas. Consequently, the pressure difference resulting from said gas flow is approximately proportional to the gas temperature. FIG. 3B shows three series of $\Delta P_{channel}$ measurements, corresponding to those of FIG. 3A, plotted against the furnace body temperature $T_{furnace\ body}$. The measurements were taken with a wafer 3 present between the two furnace bodies 2, 2', in the isothermal state of floating wafer reactor 1 after allowing sufficient time for wafer 3 to achieve furnace body temperature $T_{furnace\ body}$. As discussed before, the data in FIG. 3A may be subtracted from the data in FIG. 3B according to equation [4] in order to obtain the functions that relate the pressure drop along the wafer to the temperature of the gas bearing. The result of this subtraction, $\Delta P_{wafer}(T_{gas2})$ for the three respective mass flow rates, is shown in FIG. 3C. Although under the isothermal steady state conditions $T_{gas2}=T_{Furnace\ body}$, this relation is no longer valid during heat-up of the wafer, shortly after insertion of a wafer in the gas channel. Actually, $\Delta P_{wafer}$ is a function of $T_{gas2}$ and not of $T_{Furnace\ body}$.

A second step in the calibration procedure entails determining the inverse of $\Delta P_{wafer}(T_{gas2})$, $T_{gas2}(\Delta P_{wafer})$. Its derivative forms an indication of the sensitivity of the apparatus as a temperature measurement device at the given mass flow rate. Though the inverse may be determined analytically, which is relatively easy in the case of linear relations, a numerical/discrete determination may suffice.

Finally, the relations discussed and determined above can be unified in a single governing relation that quantitatively links the pressure drop along the gas channel, $\Delta P_{channel}$, to the average temperature of the gas in the gas bearing, $T_{gas2}$. To this end, equation [3] may be rewritten as:

$$T_{wafer}=2T_{gas2}-T_{furnace\ body}. \qquad [5]$$

As the dependency of $T_{gas2}$ on $\Delta P_{wafer}$ is known from the calibration procedure (the inverse of FIG. 3C), the following relation may be established:

$$T_{wafer} = 2T_{gas2}(\Delta P_{wafer}) - T_{furnace\ body} \qquad [6]$$
$$= 2T_{gas2}(\Delta P_{channel} - \Delta P_{furnace\ body}) - T_{furnace\ body}.$$

Practically, equation [6] expresses $T_{wafer}$ in terms of $\Delta P_{channel}$ and other known variables. After all, $T_{furnace\ body}$ is a system control parameter, while $\Delta P_{furnace\ body}$ is a constant at set gas mass flow Q and $T_{furnace\ body}$ known from the calibration procedure (see FIG. 3A). Equation [6] thus illustrates a model that may be used to obtain a temperature of the wafer from a measurement of the pressure drop in the gas flow along the gas channel. Said model may be implemented in the control unit 10 (FIG. 1), which may inform an operator of the apparatus of the present wafer temperature. Alternatively, the controller can be configured to initiate other control actions when a predefined wafer temperature has been achieved. E.g. the wafer can be withdrawn from between the furnace bodies when a predefined wafer temperature has been achieved.

It is to be noted that application of the present invention is not limited to situations wherein substrates are kept floating on a gas bearing. It may for example also be applied in vapour deposition chambers, wherein a substrate is supported mechanically while a stream of processing gas flows by, at least at one side of the substrate. Or, as in an ion implantation apparatus or sputtering apparatus, a substrate may be mechanically supported on a susceptor, clamped to the susceptor and a flow of highly conductive gas such as He may be flowing between the substrate and the susceptor with the purpose of cooling the substrate. Advantageously, in both these exemplary applications a gas stream along the substrate is present due to the nature of the treatment that the substrate is subjected to. In these cases, implementation of the method according to the invention is relatively inelaborate and information of the actual wafer temperature during processing is easily obtained. In situations where no gas flow is inherently present, one may be supplied if so desired.

It will be appreciated by those skilled in the art that various omissions, additions and modifications may be made to the processes and apparatus described above without departing from the scope of the invention. All such modifications and changes are intended to fall within the scope of the invention, as defined by the appended claims.

We claim:

1. A method for determining a temperature of a substrate, comprising:
    providing a gas channel that is confined by at least one wall having a certain wall temperature;
    providing a substrate in said gas channel, proximate to the at least one wall, such that a gap exists between a surface of the substrate and the at least one wall;
    providing a gas flow with a certain mass flow rate through said gas channel, which gas flow extends at least partially through said gap;
    determining a pressure drop in the gas flow along the gas channel; and
    deriving from said pressure drop the temperature of said substrate using a pre-determined relation between the pressure drop along the gas channel, the wall temperature and the temperature of the substrate, at said mass flow rate.

2. A method according to claim 1, wherein the substrate has a substantially flat, plate-like shape, such that it comprises two main surfaces.

3. A method according to claim 2, wherein the at least one wall extends across an entire main surface of the plate-like substrate.

4. A method according to claim 3, wherein the at least one wall is substantially flat and extends substantially parallel to the main surface of the substrate, such that the width of the gap between them is essentially constant.

5. A method according to claim 1, wherein the gap between the wall and the substrate's surface has a width less than 0.5 mm.

6. A method according to claim 1, wherein the substrate is a semiconductor wafer.

7. A method according to claim 1, wherein the gas flow has a substantially constant mass flow rate.

8. A method according to claim 1, wherein the temperature of the substrate is determined periodically.

9. A method according to claim 1, wherein the pre-determined relation between the pressure drop along the gas channel, the wall temperature and the temperature of the substrate, is ascertained empirically through a calibration procedure, comprising:
    determining the relation between the pressure drop along the gas channel, in which the substrate is present, and a temperature of the gas flow through the gas channel, at a certain mass flow rate;
    determining the inverse of said relation, so as to obtain the temperature of the gas flow as a function of the pressure drop along the gas channel, at said mass flow rate;
    relating the temperature of the gas flow to the temperature of the substrate, so as to obtain the temperature of the substrate as a function of the pressure drop along the gas channel, at said mass flow rate.

10. A method according to claim 9, wherein determining the relation between the pressure drop along the gas channel and the temperature of the gas flow includes determining the pressure drop along the gas channel at incremental values of the wall temperature, whereby after providing the substrate in the channel the substrate has been allowed sufficient time to achieve the wall temperature.

11. A method according to claim 6, wherein the temperature of the gas flow is related to the temperature of the substrate by employing the relation:

$$T_{substrate} = 2T_{gas} - T_{wall},$$

wherein $T_{substrate}$ is the temperature of the substrate, $T_{gas}$ is the temperature of the gas flow, and $T_{wall}$ is the wall temperature.

12. A method according to claim 4, wherein
    the gap between the wall and the substrate's surface has a width less than 0.5 mm; and
    the substrate is a semiconductor wafer.

13. A method according to claim 7, wherein the temperature of the gas flow is related to the temperature of the substrate by employing the relation:

$$T_{substrate} = 2T_{gas} - T_{wall},$$

wherein $T_{substrate}$ is the temperature of the substrate, $T_{gas}$ is the temperature of the gas flow, and $T_{wall}$ is the wall temperature.

* * * * *